United States Patent [19]
Glenn

[11] Patent Number: 5,349,385
[45] Date of Patent: Sep. 20, 1994

[54] ADAPTIVE SCAN CONVERTER

[75] Inventor: William E. Glenn, Fort Lauderdale, Fla.

[73] Assignee: Florida Atlantic University, Boca Raton, Fla.

[21] Appl. No.: 926,587

[22] Filed: Aug. 6, 1992

[51] Int. Cl.⁵ .............................................. H04N 7/01
[52] U.S. Cl. ..................................... 348/458; 348/445
[58] Field of Search .................. 358/140, 11; 348/445, 348/458; H04N 7/01

[56] References Cited

U.S. PATENT DOCUMENTS

| | | | |
|---|---|---|---|
| 4,051,531 | 9/1977 | Baldwin | 358/140 |
| 4,587,556 | 5/1986 | Collins | 358/11 |
| 4,791,481 | 12/1988 | Kozuki et al. | 358/140 |
| 4,891,701 | 1/1990 | Shikina et al. | 358/11 |

FOREIGN PATENT DOCUMENTS 276989 2/1992 Japan .......................... H04N 7/01

OTHER PUBLICATIONS

RGB/Videolink 1450A and 1450AX Scan Converters-2 pages-Copyright 1990.
EOS-The Essential Standards Converter from AVS-Advertisement of A. F. Associates Inc.-Undated.
"The Missing Link"-Advertisement by Modern-*PC Week*, Apr. 6, 1992, p. 28.

Primary Examiner—James J. Groody
Assistant Examiner—Glenton B. Burgess
Attorney, Agent, or Firm—Brumbaugh, Graves, Donohue & Raymond

[57] ABSTRACT

A scan converter capable of converting from any of several input scan formats to a fixed output format, which may or may not have the same number of lines as the input, derives a current displayed (output) field or frame by interpolation from the current field of an input whose vertical scan frequency is the same as that of the output. The converter recognizes the number of lines in the input and automatically derives the appropriate interpolation routine to make the conversion to a desired fixed output format. Because the vertical scan frequency is the same for the input and output, only a few lines of storage, instead of the frame store usually required, are needed to accomplish conversion with results comparable to that attainable when a full frame of information is stored.

10 Claims, 3 Drawing Sheets

ADAPTIVE SCAN CONVERTER

BACKGROUND OF THE INVENTION

The present invention relates generally to information displays and, more particularly, to apparatus for converting from any of several input scan formats to a fixed output format.

Information displays are rapidly converting from cathode ray tube (CRT) technology to various forms of solid-state driven matrix displays. While CRT's can easily be scanned with various formats simply by changing the vertical and horizontal scan frequencies, matrix displays have a fixed geometrical format. Matrix displays can easily be scanned at different vertical frequencies, but the number of lines in the vertical direction, and the aspect ratio of the image, are both fixed.

As a consequence of the widespread use of computers and many television formats, there is wide range of scan formats ranging from 262 lines to 2,048 lines. Vertical scan frequencies range from 50 to 72 Hz, scan formats are both progressive and interlaced, and aspect ratios vary from 16:9 to 3:4. Accordingly, if one uses a fixed pattern CCD television camera, for example, and wishes to present the video information on a display having a fixed format different from that of the camera, it is necessary to scan convert. While it is fairly easy to operate either the camera or the display at any desired vertical scan rate, such as 59.94 Hz, 60 Hz or 50 Hz., there is a problem should it be necessary to use a different number of lines than the device was made for, be it camera or display, because of their fixed physical pattern.

Interpolation has long been successfully used for scan conversion, and usually involves interpolation between two adjacent lines with the appropriate ratios for the derived output line. An example of such known apparatus is the line-rate converter described in the article entitled "An HDTV Down-Converter for Post-Production", L. Thorpe et al, SMPTE Journal, February 1990, pp 124–135, in which the 525-line rate required at the output is synthesized from the higher 1125-line rate of the HDTV input. The HDN-2000 down-converter described in this article is an intra-field line-rate converter that uses a frame store and a moderately sophisticated interpolation scheme. Breaking the 1125-to-525 conversion ratio down to its simplest form produces the ratio 15:7, indicating that the line interpolation process requires fifteen lines of HDTV video to synthesize seven output lines of 525-line video. Within this structure, the line interpolation process becomes a decision about how many adjacent HDTV input lines will be employed to structure a single output line of video. The hardware implementation of the interpolation consists of a series of one-line delay elements that allow simultaneous access to each of the requisite number of HDTV input lines; the HDN-2000 used four HDTV input lines to construct a given 525 output line, which gives better performance than if only two lines are used for the interpolation routine.

It is known from the article entitled "Signal Processing for Compatible HDTV", W. E. Glenn and K. Glenn, SMPTE Journal, November 1989, pp. 812–816, that interline flicker occurs with interlaced scans due to the residual low spatial frequencies that are displayed with counterphase flicker at the frame rate. Among the circuits discussed for solving the interline flicker problem is the signal processor used in an IDTV receiver in which 525 lines can be displayed progressively by scan conversion from the 525-line interlaced NTSC transmission. A high-pass digital spatial filter passes information for the top octave of the signal vertically and horizontally, which information is stored in a frame store. The low spatial-frequency information is derived from the current field of the interlaced transmission. High- and low-frequency information is combined and read out progressively at 60 frame per second.

These are but two examples of known scan converters which use a frame store in which the input signal is stored and then taken out at a different line rate by performance of a suitable interpolation routine. Such use of frame stores is premised on the theory that the vertical resolution in a camera is one frame line high and that, therefore, a frame store must be used when converting, say, from an interlaced input to a progressive output. Actually, the vertical resolution in most cameras is two lines high so that there is little, if any, advantage in using a frame store in converting from interlaced to progressive; indeed, the use of a frame store has the disadvantage that some information is delayed by a field behind other information which causes undesirable smear in moving objects, which has to be circumvented with adaptive processing which may include motion detection, all of which adds to the complexity and cost of the scan converter.

A primary object of the present invention is to provide an adaptive scan converter which is relatively simple and sufficiently low in cost to enjoy widespread acceptance.

Another object of the invention is to provide a scan converter having the capability of converting from any of several input scan formats to a fixed output format.

Other objects of the invention are to provide a scan converter which automatically provide the correct aspect ratio; and which provides a progressive display with good motion rendition and good vertical resolution, without interline flicker, regardless of whether the input is interlaced or progressive.

SUMMARY OF THE INVENTION

Briefly, the scan converter according to the invention does not employ a frame store, but instead derives the current displayed field or frame by interpolation from a current input field. The same vertical scan frequency is used for the input and the output, whereby the input and output, even though having a different number of lines, are physically scanning in the same place, vertically, such that only a few lines of storage are needed to accomplish conversion with results at least as good, and in some respects better, than that obtained when the information is derived from a stored frame. Based on the number of lines in the output display, which is read into the converter under external control, the circuit recognizes the number of lines in the input and automatically derives the appropriate interpolation routine to make the conversion to the desired fixed output format.

Other objects, features and advantages of the invention will become apparent, and its construction and operation better understood, from the following detailed description, read in conjunction with the accompanying drawings.

DESCRIPTION OF THE PREFERRED EMBODIMENT

Figure 1:
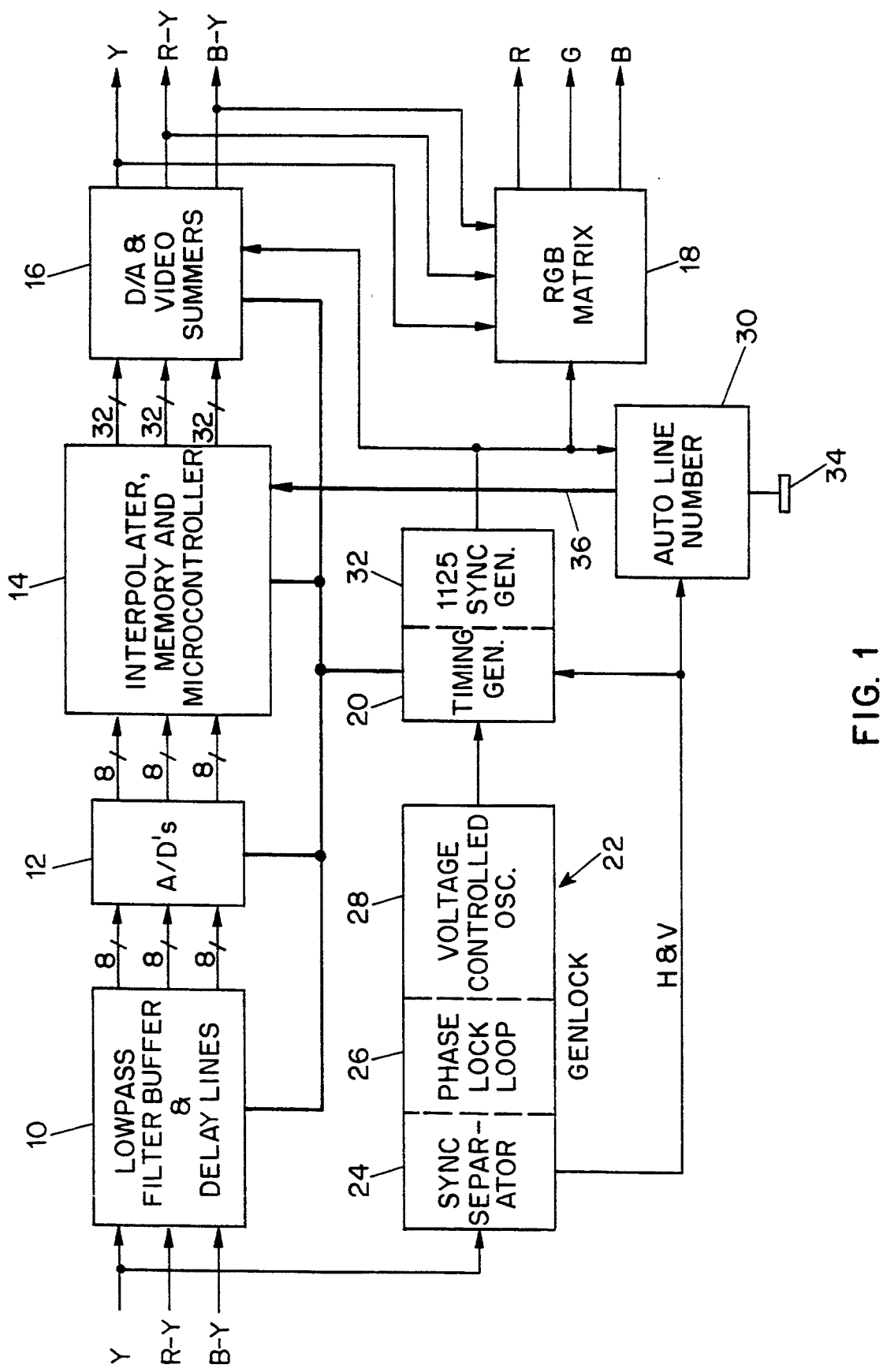
FIG. 1 is a functional block diagram of a scan converter system constructed in accordance with the invention.

Referring to FIG. 1, the scan converter according to the invention comprises an input filter section 10 for the three components Y, R-Y and B-Y of an input video signal. The input signal may have any one of several currently used formats including 1125-line interlaced, 1050-line progressive or interlaced, 750-line progressive, or 525-line interlaced. The filtered input signal is then applied to analog-to-digital converters 12, one for each component, to an interpolator, memory and microcontroller system 14, and to digital-to-analog converters and video summers 16 for producing three analog output video components in a format different from the input format. A RGB matrix 18 is provided for converting the video components to R, G. B color signals if desired. The system will be described in the context of converting a 525-line interlaced input format at a vertical scan rate of 60 fields/sec. to an 1125-line interlaced output format, which in accordance with an important aspect of the invention also has a vertical scan rate of 60 fields/sec.

The operation of these basic building blocks is synchronized with timing signals produced by a timing generator 20 which, in turn, are locked to the sync pulses of the input by a genlock circuit 22 of known construction including a sync separator 24 for stripping H and V sync pulses from the luminance component of the input signal, a voltage controlled oscillator (VCO) 26 and a phase lock loop 28. The H and V pulses derived by sync separator 24 are applied to timing generator 20, along with the output of VCO 28, and are also applied to a block 30 labeled "Auto Line Number", along with an 1125 line signal produced by an 1125 lines sync generator 32 synchronized to timing generator 20. Based on a fixed 1125-line output and several different input formats, identified as A, B, C . . . etc., the following interpolation ratios or patterns are obtainable:

$$\frac{1125}{A}, \frac{1125}{B}, \frac{1125}{C} \cdots \frac{1125}{D}$$

These ratios are stored in memory (RAM) embodied in block 30 and compared with the current input to create a match; this match determines the scan conversion routine. Otherwise stated, the function of block 30, given the number of lines there are to be in the output format, is to recognize the number of lines in the input (525 in the present example) to automatically derive the appropriate interpolator routine to cause interpolator 14 to make the conversion to an 1125 line progressive output format at a 60 fields/sec. vertical scan rate. An external control 34, a user-controlled switch that determines what output format is to be used, tells the Auto Line Number circuit 30 how many lines the output format is to have which, in turn, affects the interpolation ratio, so that it knows how many horizontal sync pulses it needs to generate for each vertical sync pulse. That the input and output scan frequencies are the same is insured by passing the vertical synch pulses derived from the input signal through block 30. The vertical sync pulses and the required number of horizontal sync pulses are applied via line 36 to the interpolator 14 in which the desired conversion is performed.

Figure 2:
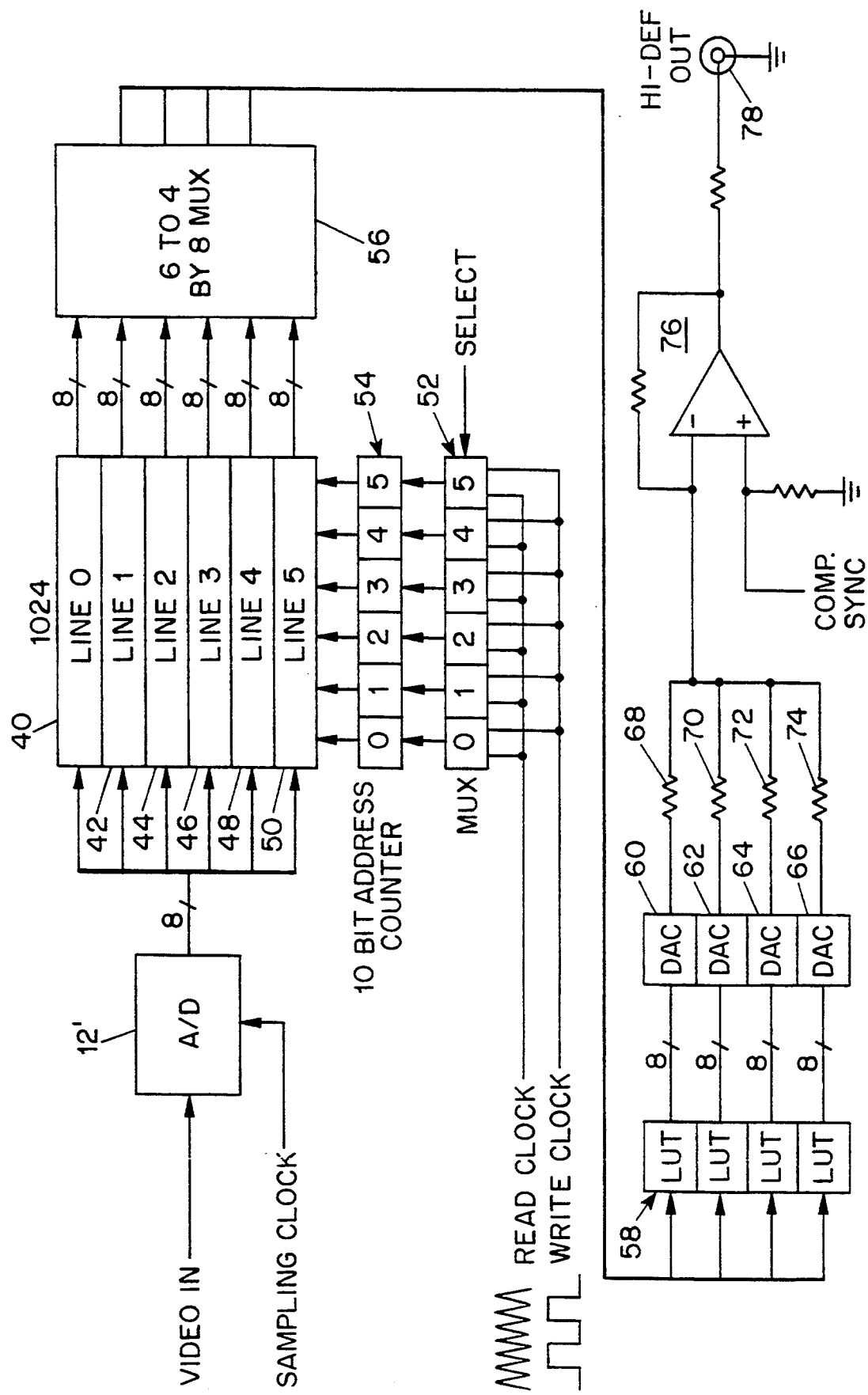
FIG. 2 is a block diagram which illustrates in greater detail the scan converter process of the invention.

The interpolation process will be understood from the following description of FIG. 2, which is a detailed block diagram of that portion of the system shown in FIG. 1 required to process one of the three video components, for example, the luminance signal Y. Currently, most color is encoded in component format and clocked at half the rate of luminance; thus, to handle the color components shown in FIG. 1 would require another scan converter identical to the one shown in FIG. 2 into which R-Y and B-Y would be clocked alternately via a suitable multiplexer (not shown) and then clocked out alternately at the output. Staying with the example used in describing FIG. 1, six successive lines of the analog luminance component of a 525-line interlaced signal at 60 fields/sec., after suitable filtering, are successively applied to an analog-to-digital converter 12' controlled by a sampling clock derived from a timing generator synchronized with the H and V pulses of the luminance signal, such as the timing generator 20 shown in FIG. 1. The 8-bit digital output signals of the A/D converter, representing the six successive lines, are successively read into six digital delay elements 40, 42, 44, 46, 48 and 50, under control of a write clock synchronized with the vertical line rate and applied to the delay elements via a six-element select switch 52 and a 10-bit address counter 54. Each of these delay elements, labeled line 0, line 1, line 2, . . . line 5, respectively, has one horizontal line duration at the 525 line rate. Based on the 525-line input and an 1125-line output the auto line number 30 selects the appropriate interpolation ratio or pattern which, in turn, selects the necessary timing to read and write the memory buffers 40, 42, 44, . . . 46, 48 and 50. The relationship between the rate at which the lines are written and the rate at which the lines are read is the aforementioned interpolation ratio or pattern. In the present example, which represents a worst case as respects the required amount of line buffer storage, a ratio or pattern of 2.14 will be selected from memory and as a result lines will be written at 63.55 $\mu$sec and read at 29.66 $\mu$sec. This means that 2.14 lines at the high definition rate are formed for each NTSC line interval.

The information for the current output field image is derived by interpolation from the current field by synthesizing high definition output lines at the 1125-line rate from a number of adjacent (preceding and following) NTSC lines 0, 1, 2, etc. according to the expression $N_o = K_1 \cdot \text{line } 0 + K_2 \cdot \text{line } 1 + K_3 \cdot \text{line } 2 + \ldots + K_m \cdot \text{line}_n$, where the factors K are coefficients that determine the specific contributions from each of the NTSC television lines required to formulate the high definition 1125 output line $N_o$. Under control of a 1125 line read clock (derived from block 30 in FIG. 1) applied to the one-line memories 40–50 via the multiplexed select switch 52 and address counter 54, the information stored in an adjacent four of the memories is read out and applied to respective input terminals of a 6-to-4 by 8 multiplexer 56, while at the same time information is written into one of the remaining two of the one-line memories. Each of the selected current four lines of information, which appear at respective output terminals of MUX 56, is fed to a respective look-up table 58 (LUT). The look-up tables contain the results of the coefficients that are implemented on the time-base-corrected signals. The values of these coefficients determine the weighting or contribution of the line to any high definition line. The four digital output signals from the four LUTS are applied to the inputs of respective digital-to-analog converters 60, 62, 64 and 66, the outputs of which are mathematically summed, with application of the individual coefficients, in a network of video summers represented by resistors 68, 70, 72 and 74. The sum signal produced at the connected output terminals of the network is applied to the inverting terminal of an operational amplifier 76; a composite sync signal consisting of the 60 fields/sec. vertical sync pulses derived from the input signal by the GENLOCK system 22 and horizontal sync pulses produced by sync generator 32 (FIG. 1) is applied to the non-inverting input. Each output line produced at output terminal 78 is always physically located, on the display screen, between two input lines and its information is obtained by adding the information from these two lines in the proper proportions, represented by the coefficients alluded to earlier. The sum of the proportions is always equal to one, and the ratio of the proportions is equal to the distance on the screen from the output lines; i.e., if the output line is $\frac{1}{4}$ of the distance from line A to line B of the input, it will take $\frac{3}{4}$ of the signal from line A and $\frac{1}{4}$ of the signal from line B. This principle is followed regardless of whether the fields of either the input or output are interlaced.

Figure 3:
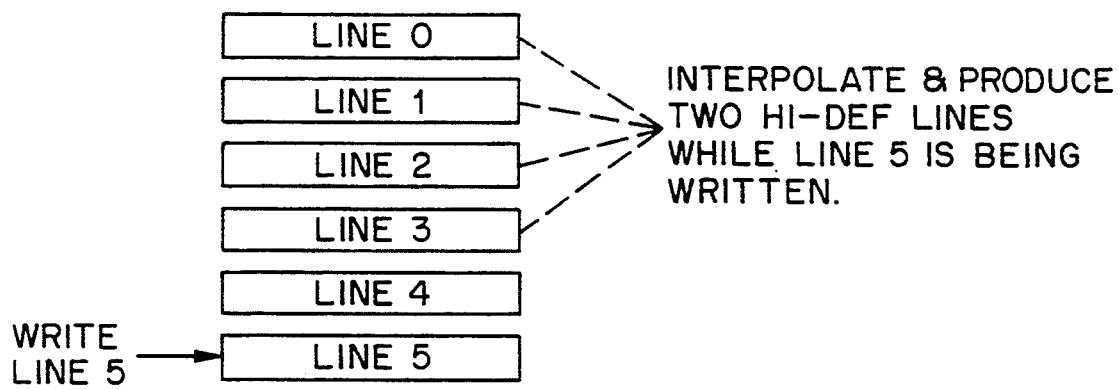
FIG. 3 is a schematic representation of interpolation of a 1125-line output from a 525-line input.
Figure 3:
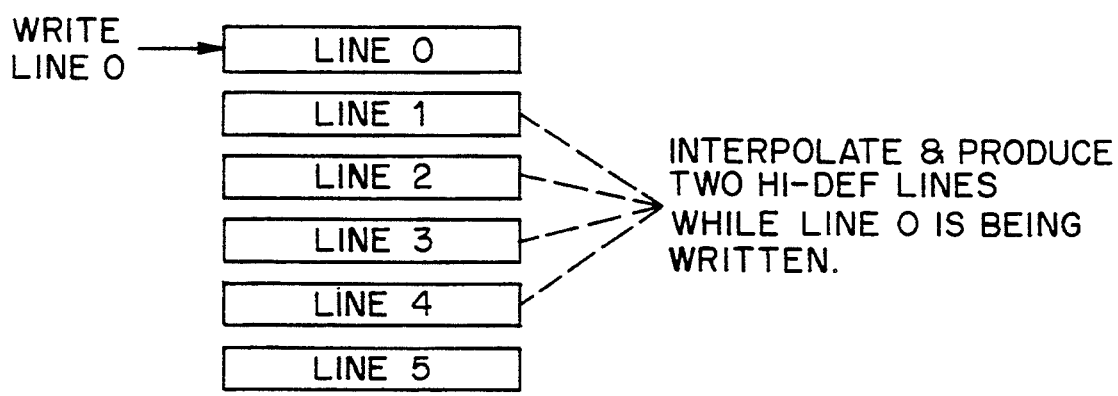
Figure 3:
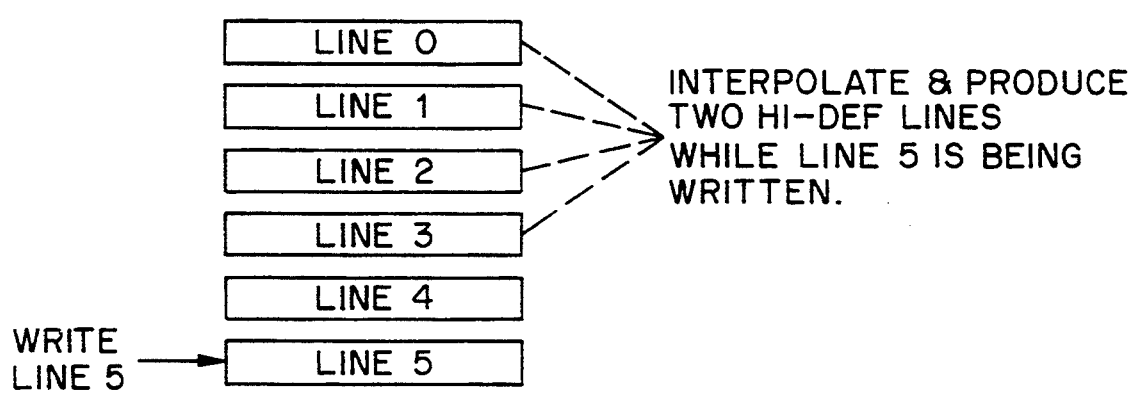

FIG. 3 shows schematically how four NTSC input lines are interpolated to produce the 1125-line output format. In the uppermost diagram, lines 0, 1, 2 and 3 are being interpolated, to produce two high definition lines, while at the same time line 5 is being written into memory. Next, lines 1 through 4 are interpolated to produce two more high definition lines, while line 0 is being written into memory. The sequence continues until seven NTSC lines have been read out and fifteen high definition lines have been produced, whereupon the sequence is repeated, as indicated in the lower diagram. As each picture element within the output line number is being structured, its time phasing, relative to the input 525-line contributing samples, progressively alters the ratio of the proportions of the contributions from each of the input lines required to formulate the high definition output line.

While only two stored input lines of information are needed at any given instant to produce one output line, the actual implementation requires storage of more than two because of the necessity for clocking the information into one line store at one rate while a previous line is being clocked out of another store at another rate. Generally, line stores cannot be loaded and unloaded at the same time and cannot be clocked at two different rates. Also, since an output line may start in the middle of the time interval of an input line, some additional storage is needed to allow the lines to operate in full line increments (since the input and output are not synchronous). As a consequence of these two factors, it is necessary to provide several line stores even though only two lines of information are really needed.

While the scan converter has been described as converting a 525-line interlaced input to a fixed 1125-line interlaced output format, it is capable of converting any of several different input formats to one of several different output formats, provided, always, that the input and output vertical scan frequencies are the same. For example, if the output is 1125-line progressive at 60 frames/sec., then the inputs that can be handled (in addition to 525-line interlaced already discussed) would be 1125-interlaced, 1050-line progressive or interlaced, or 750-line interlaced—all at 60 fields/sec. vertical scan rate. As another example, if in a European system the desired output format is 1250-line interlaced at 50 FPS, the input could be 625-line at 50 field/sec. In each case, the input signal would have to be converted to component signals (Y, $C_W$, $C_N$) before scan converting.

If, for example, the output is 1125-line, 59.94 frames/sec., progressive, then the output horizontal scan frequency is 67.4325 kHz. If the input were 1050-line, 59.94 frames/sec. progressive, the horizontal scan frequency would be 62.937 KHz.

Since the input to the present scan converter is fixed, its aspect ratio will have to be preserved; consequently, cropping vertically along either side of the image is necessary. However, the image can be shifted to one side or the other in order to leave space for additional information, such as "Picture in a Picture". These options would be at the election of the user.

Although the invention has been described herein with reference to a specific embodiment, many modifications and variations therein will readily occur to those skilled in the art. Accordingly, all such modifications and variations are within the intended scope of the invention as defined by the following claims.

I claim:

1. Scan conversion apparatus for converting an input signal having an input format and a predetermined vertical scan frequency to a selected fixed output format also having said predetermined vertical scan frequency, said apparatus comprising:
   (a) means for recognizing the number of lines in said input format;
   (b) means responsive to the number of lines recognized in said input format and to the number of lines in said selected fixed output format for automatically deriving an interpolation ratio to make the conversion from said input format to said selected fixed output format; and
   (c) interpolation means for deriving by interpolation according to said derived interpolation ratio, a current field or frame having said selected fixed output format from a current field of an input signal having said input format.

2. Scan conversion apparatus for converting an input signal having an input format and a predetermined vertical scan frequency to a selected fixed output format also having said predetermined vertical scan frequency, said apparatus comprising:
   (a) means for recognizing the number of lines in said input format and responsively thereto automatically deriving an interpolation ratio to make the conversion to said selected fixed output format; and
   (b) interpolation means for deriving by interpolation according to said derived interpolation ratio a current field or frame having said selected fixed output format from a current field of an input signal having said input format, wherein said interpolation means comprises:
   line storage means for separately storing at a first rate at least two adjacent lines of information from a current field of said input signal;
   means for reading said stored at least two adjacent lines of information from said line storage means at a second rate determined by said derived interpolation ratio; and means for summing the information contained in said at least two read out adjacent lines in selected proportions for producing a line of said selected fixed output format.

3. Scan conversion apparatus as defined in claim 2, wherein said means (a) includes:

means for storing a plurality of interpolation ratios which represent the ratios between the number of lines in said selected fixed output format and the number of lines in a corresponding plurality of possible input formats, and means for comparing the number of lines in a current input signal with said stored interpolation ratios and responsively to a match deriving the required interpolation ratio.

4. Scan conversion apparatus as defined in claim 2, wherein said apparatus further comprises means for converting said input signal to digital form, and wherein said interpolation means (b) comprises:

digital line-storage means for separately storing at a first rate at least two and up to four adjacent lines of information from a current field of said input signal;

means for reading said digitally stored at least two and up to four lines of information from said line storage means at a second rate determined by said derived interpolation ratio;

means for converting to analog form said at least two and up to four read out adjacent lines; and means for summing the information contained in said analog versions of said at least two and up to four adjacent lines in selected proportions for producing a line of said selected fixed output format.

5. Scan conversion apparatus as defined in claim 4, wherein said means (a) includes:

means for storing a plurality of interpolation ratios which represent the ratios between the number of lines in a given fixed output format and the number of lines in a corresponding plurality of input formats capable of being converted to said given fixed output format, and means for comparing the number of lines in a current input signal with said stored interpolation ratios and responsively to a match deriving the interpolation required to convert the current input signal to said given output format.

6. Scan conversion apparatus for converting a first signal having a first format and a predetermined vertical scan frequency to a selected second fixed format also having said predetermined vertical scan frequency, said apparatus comprising:

(a) means for recognizing the number of lines in said first format;

(b) means responsive to the number of lines recognized in said first format and to the number of lines in said selected second fixed format for automatically deriving an interpolation ratio required to make the conversion to said selected second fixed format; and (c) means including interpolation means for deriving by interpolation according to said derived interpolation ratio, a current field or frame having said second fixed format from a current field having said first format.

7. Scan conversion apparatus for converting a first signal having a first format and a predetermined vertical scan frequency to a selected second fixed format also having said predetermined vertical scan frequency, said apparatus comprising:

(a) means for recognizing the number of lines in said first format and responsively thereto automatically deriving an interpolation ratio required to make the conversion to said selected second fixed format; and (b) means including interpolation means for deriving by interpolation according to said derived interpolation ratio, a current field or frame having said second fixed format from a current field having said first format wherein said means (b) comprises:

line storage means for separately storing at a first rate at least two adjacent lines of information from a current field of said first signal;

means for reading said stored at least two adjacent lines of information from said line storage means at a second rate determined by said derived interpolation ratio; and means for summing the information contained in said at least two read out adjacent lines in selected proportions for producing a line of said second fixed output format.

8. Scan conversion apparatus as defined in claim 7, wherein said means (a) includes:

means for storing a plurality of interpolation ratios which represent the ratios between the number of lines in said second fixed format and the number of lines in a corresponding plurality of possible first formats, and means for comparing the number of lines in a current input signal with said stored interpolation ratios and responsively to a match deriving the required interpolation ratio.

9. Scan conversion apparatus as defined in claim 7, wherein said apparatus further comprises means for converting said first signal to digital form, and wherein said means (b) comprises:

digital line-storage means for separately storing at a first rate at least two and up to four adjacent lines of information from a current field of said first signal;

means for reading said digitally stored at least two and up to four lines of information from said line storage means at a second rate determined by said derived interpolation ratio;

means for converting to analog form the information from said at least two and up to four read out adjacent lines; and means for summing the information contained in said analog versions of said at least two and up to four adjacent lines in selected proportions for producing a line of said second fixed output format.

10. Scan conversion apparatus as defined in claim 9, wherein said means (a) includes:

means for storing a plurality of interpolation ratios which represent the ratios between the number of lines in a given second fixed format and the number of lines in a corresponding plurality of first formats capable of being converted to said given second fixed format, and means for comparing the number of lines in a current first signal with said stored interpolation ratios and responsively to a match deriving the interpolation required to convert the current first signal to said given second fixed format.

* * * * *